US007826210B2

(12) United States Patent
Cravens et al.

(10) Patent No.: US 7,826,210 B2
(45) Date of Patent: Nov. 2, 2010

(54) SLIDING FRONT CARRIAGE FOR AN INFORMATION HANDLING SYSTEM CHASSIS

(75) Inventors: Zachary Allen Cravens, Round Rock, TX (US); Lisa Maria Sura, Cedar Park, TX (US); Andrew Harman Frisch, Austin, TX (US)

(73) Assignee: Dell Products L.P., Round Rock, TX (US)

(*) Notice: Subject to any disclaimer, the term of this patent is extended or adjusted under 35 U.S.C. 154(b) by 145 days.

(21) Appl. No.: 12/349,962

(22) Filed: Jan. 7, 2009

(65) Prior Publication Data

US 2010/0172076 A1 Jul. 8, 2010

(51) Int. Cl.
*G06F 1/16* (2006.01)
(52) U.S. Cl. .............................. 361/679.39; 360/77.02; 720/675; 248/278.1; 369/30.31
(58) Field of Classification Search ................. 360/110, 360/294.4, 256.4, 254.7, 97.01, 92.1, 77.02; 347/30, 108, 104; 248/326, 129, 278.1, 200; 720/605, 606, 667, 675, 624; 369/30.86, 369/30.31, 13.21; 361/679.2, 679.32, 679.37, 361/679.41, 679.44, 679.58, 679.59, 679.39
See application file for complete search history.

(56) References Cited

U.S. PATENT DOCUMENTS

| 4,139,875 | A  | * | 2/1979 | Tatara et al. .................. 360/94 |
| 6,525,930 | B1 | * | 2/2003 | Rumney ................ 361/679.32 |
| 2003/0151845 | A1 | * | 8/2003 | Koganezawa et al. ..... 360/77.02 |
| 2007/0025095 | A1 |   | 2/2007 | Beall et al. .................. 361/796 |

* cited by examiner

*Primary Examiner*—Hung V Duong
(74) *Attorney, Agent, or Firm*—Baker Botts L.L.P.

(57) ABSTRACT

An information handling system chassis includes a chassis base, a carriage, and a carriage sliding system. The chassis base is configured to house a plurality of first electrical components. The carriage is configured to house one or more second electrical components such that a user may access the one or more second electrical components from a front side of the chassis. The carriage sliding system is configured to slidably couple the carriage to the chassis base such that the carriage can be slid forward to an access position and rearward to a storage position. In the storage position of the carriage, a front area of the chassis base configured to receive one or more first electrical components is covered by the carriage, whereas in the access position of the carriage, at least a portion of the front area of the chassis base is not covered by the carriage.

20 Claims, 8 Drawing Sheets

SLIDING FRONT CARRIAGE FOR AN INFORMATION HANDLING SYSTEM CHASSIS

TECHNICAL FIELD

The present disclosure relates in general to information handling systems, and more particularly to an information handling system chassis having a sliding front carriage.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems (e.g., servers) are deployed in chasses, which may be arranged in racks or other enclosures or supporting structures. Some server chasses include a front portion, or front bay, for housing components that may be frequently accessed by users, such as disk drives, optical drives, tape units, control panels, etc. Other server components, such as a motherboard, power supplies, fans, etc. may be located behind the front bay, which may require physical manipulation of the chassis in order to access such components.

SUMMARY

According to certain embodiments of the present disclosure, an information handling system chassis includes a chassis base, a carriage, and a carriage sliding system. The chassis base is configured to house a plurality of first electrical components. The carriage is configured to house one or more second electrical components such that a user may access the one or more second electrical components from a front side of the chassis. The carriage sliding system is configured to slidably couple the carriage to the chassis base such that the carriage can be slid forward to an access position and rearward to a storage position. In the storage position of the carriage, a front area of the chassis base configured to receive one or more first electrical components is covered by the carriage, whereas in the access position of the carriage, at least a portion of the front area of the chassis base is not covered by the carriage.

According to certain embodiments of the present disclosure, a system includes an information handling system including one or more first electrical components and one or more second electrical components, and an information handling system chassis for housing the information handling system. The chassis includes a chassis base, a carriage, and a carriage sliding system. The chassis base houses the one or more first electrical components. The carriage houses the one or more second electrical components such that a user may access the one or more second electrical components from a front side of the chassis. The carriage sliding system is configured to slidably couple the carriage to the chassis base such that the carriage can be slid forward to an access position and rearward to a storage position. In the storage position of the carriage, one or more particular first electrical components are covered by the carriage, whereas in the access position of the carriage, the one or more particular first electrical components are not covered by the carriage.

According to certain embodiments of the present disclosure, a system includes a rack, and a plurality of information handling system chasses supported by the rack, each information handling system chassis housing an information handling system. At least one information handling system chassis includes a chassis base, a carriage, and a carriage sliding system. The chassis base is configured to house a plurality of first electrical components. The carriage is configured to house one or more second electrical components such that a user may access the one or more second electrical components from a front side of the chassis. The carriage sliding system is configured to slidably couple the carriage to the chassis base such that the carriage can be slid forward to an access position and rearward to a storage position. In the storage position of the carriage, a front area of the chassis base configured to receive one or more first electrical components is covered by the carriage, whereas in the access position of the carriage, at least a portion of the front area of the chassis base is not covered by the carriage.

BRIEF DESCRIPTION OF THE DRAWINGS

A more complete understanding of the disclosed embodiments and advantages thereof may be acquired by referring, by way of example, to the following description taken in conjunction with the accompanying drawings, in which like reference numbers indicate like features, and wherein.

DETAILED DESCRIPTION

Preferred embodiments and their advantages are best understood by reference to FIGS. 1-5.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Figure 1:
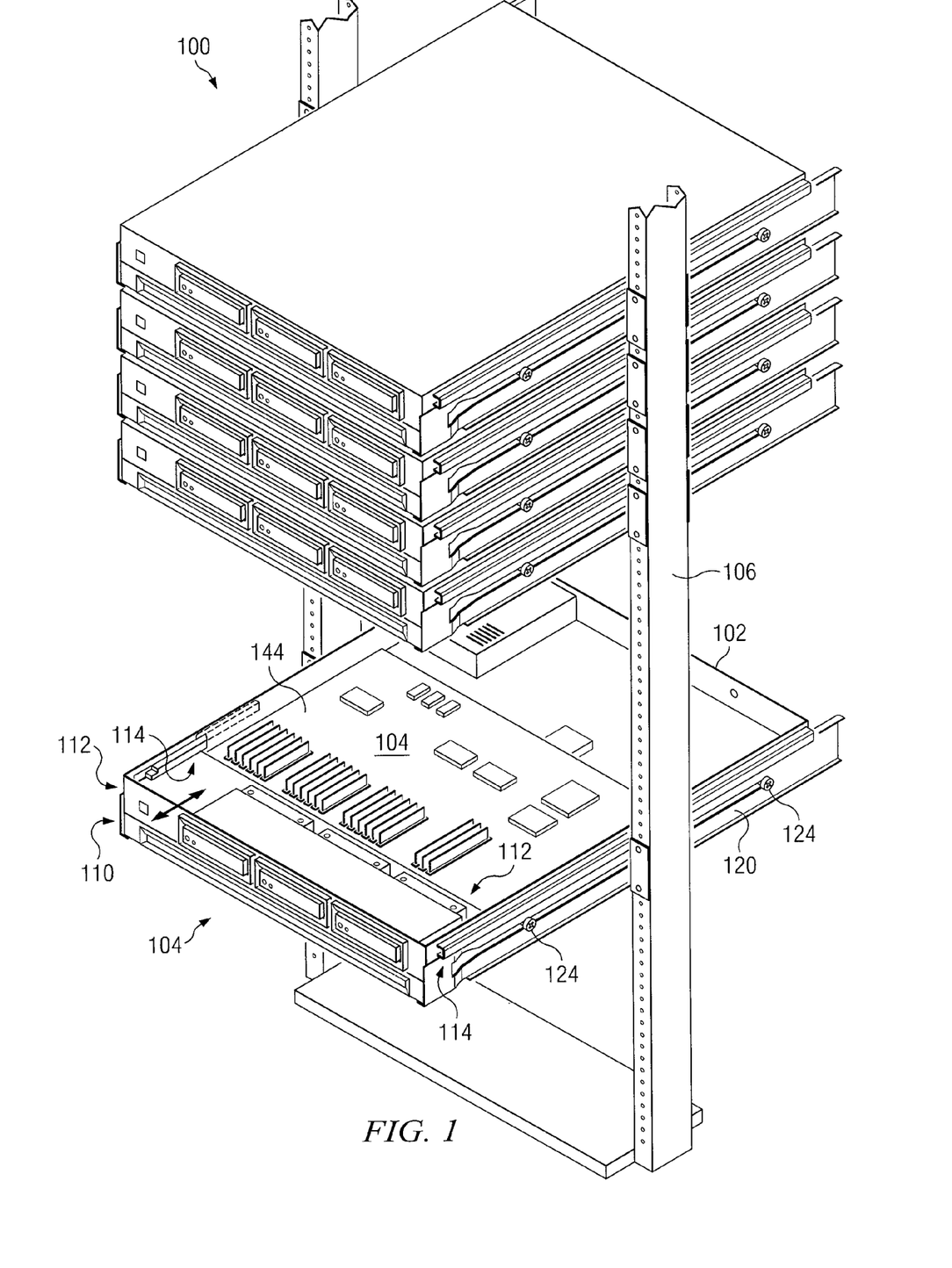
FIG. 1 illustrates an example system including a plurality of information handling system chasses supported in a rack, according to certain embodiments of the present disclosure.

FIG. 1 illustrates an example system 100 including a plurality of information handling system chasses 102 supported in a rack 106, according to certain embodiments of the present disclosure. Each information handling system chassis 102 houses an information handling system 104. In this example, each information handling system 104 is a server 104 housed in a server chassis 102. However, information handling systems 104 may include any other type of information handling systems.

Each chassis 102 (or at least one chassis 102) includes a chassis base 110 a carriage, or front bay, 112, and a carriage sliding system 114 for slidably coupling carriage 112 to chassis base 110. Chassis base 110 is configured to house various information handling system components, e.g., a motherboard including various electrical components. Carriage 112 is also configured to house various information handling system components, including components that may be frequently accessed by users, e.g., one or more disk drives, optical drives, tape units, control panels, etc. Carriage 112 provides a user access to such system components from a front side of the chassis 102.

Carriage sliding system 114 comprises any system for slidably coupling carriage 112 to chassis base 110 such that carriage 112 can be slid forward to an access position and rearward to a storage position. In the storage position of carriage 112, a front area of chassis base 110 configured to receive one or more electrical components is covered by carriage 112, whereas in the access position of carriage 112, at least a portion of the front area of chassis base 110 is not covered by carriage 112. Carriage sliding system 114, as well as the storage and access positions of carriage 112, are shown and discussed in greater detail below with reference to FIGS. 2-4.

Chasses 102 may be supported in rack 106 in any suitable manner. In the illustrated example, each chassis 102 is supported by a pair of rails 120 on each lateral side of chassis 102. Rails 120 may be coupled to rack 106 in any suitable manner, e.g., by fasteners (screws, bolts, etc.), hooks, welding, etc. Each chassis 102 may include one or more securing elements 124 (see FIGS. 2A-2C) extending from each lateral side of chassis base 110. Securing elements 124 may be configured to be received in slots formed in rails 120 such that each chassis 102 may be slid into and out of a pair of rails 120.

Figure 2A:
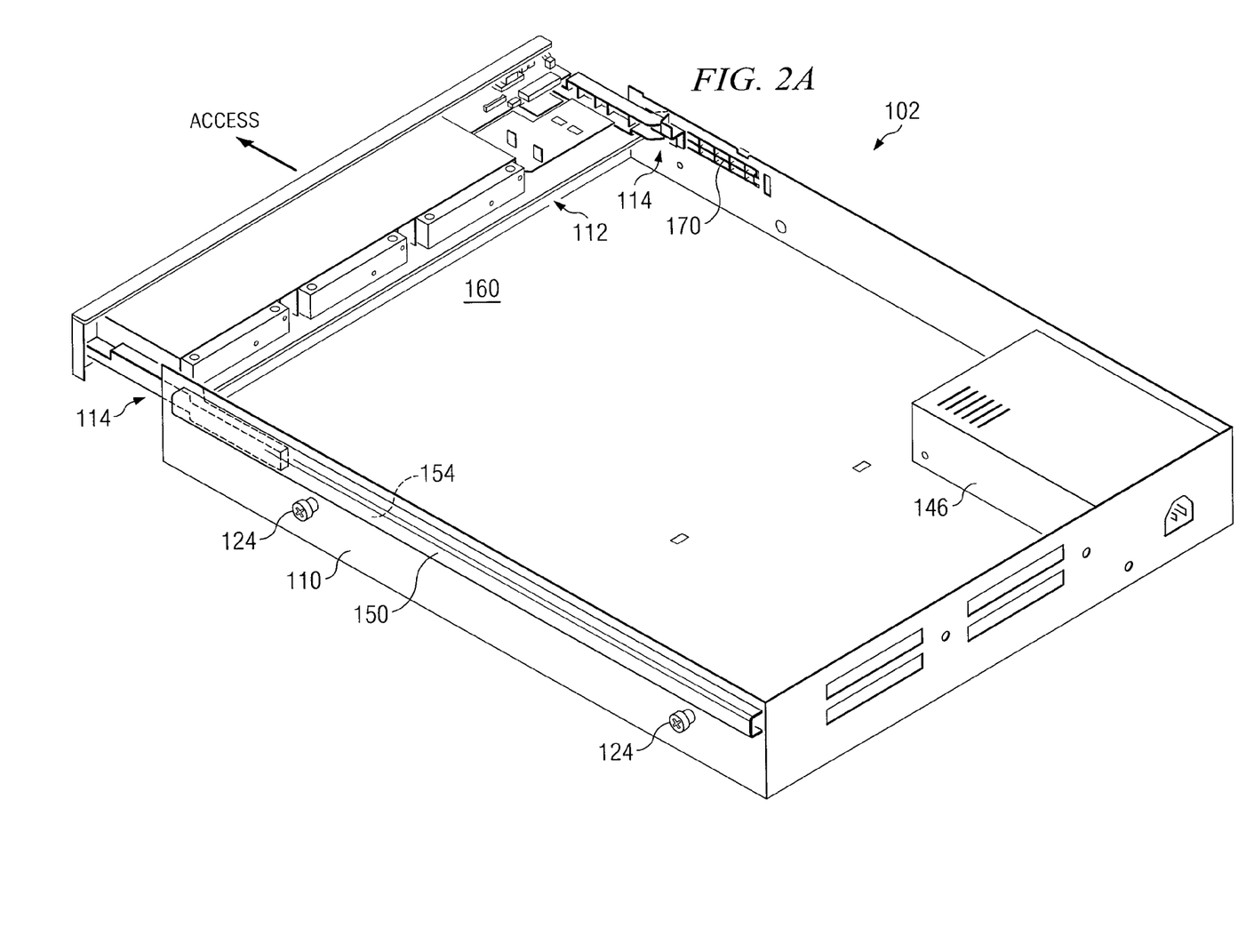
FIGS. 2A-2C illustrate three-dimensional views of a chassis having a sliding carriage in various configurations, according to certain embodiments of the present disclosure.
Figure 2B:
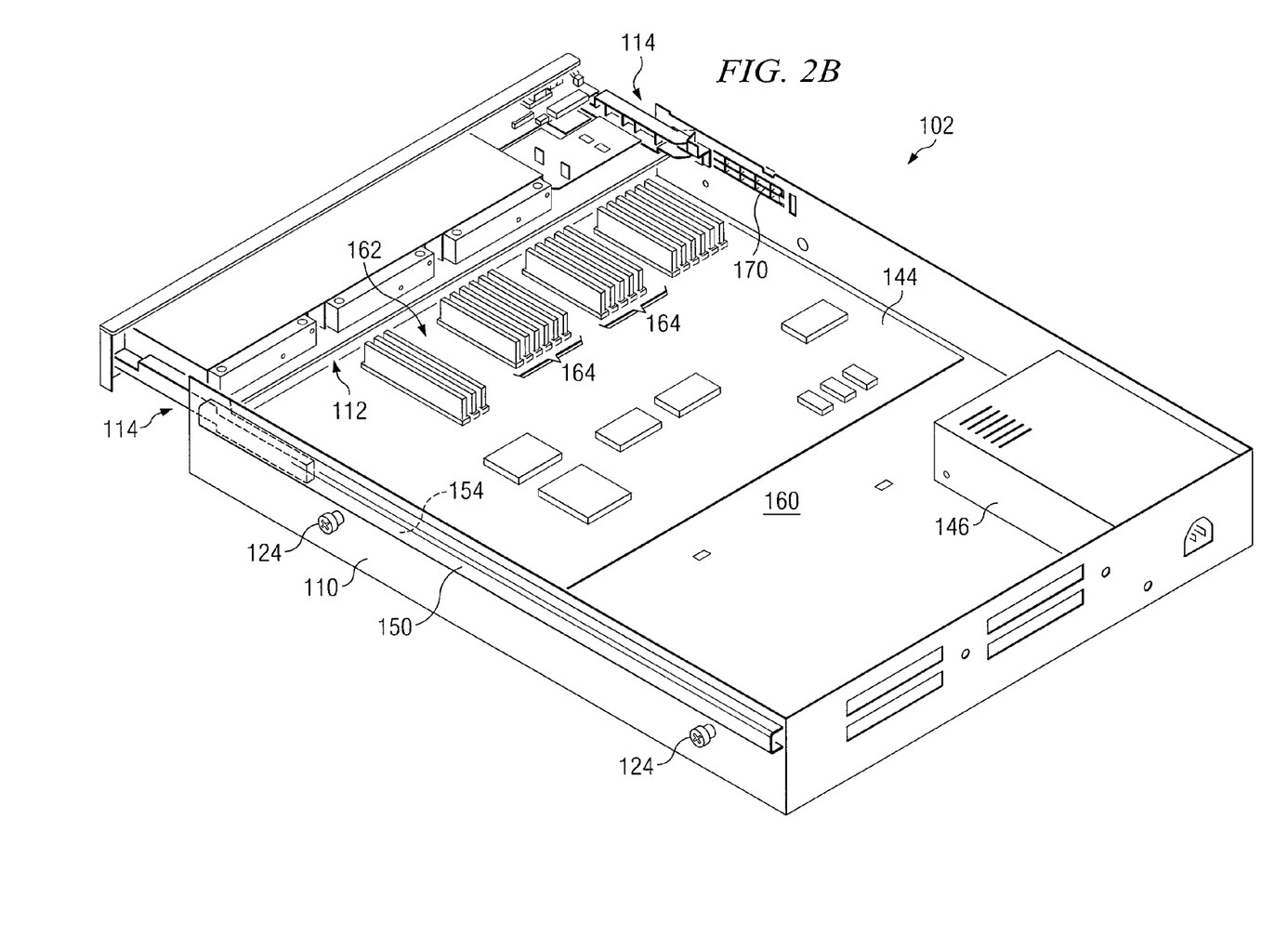
Figure 2C:
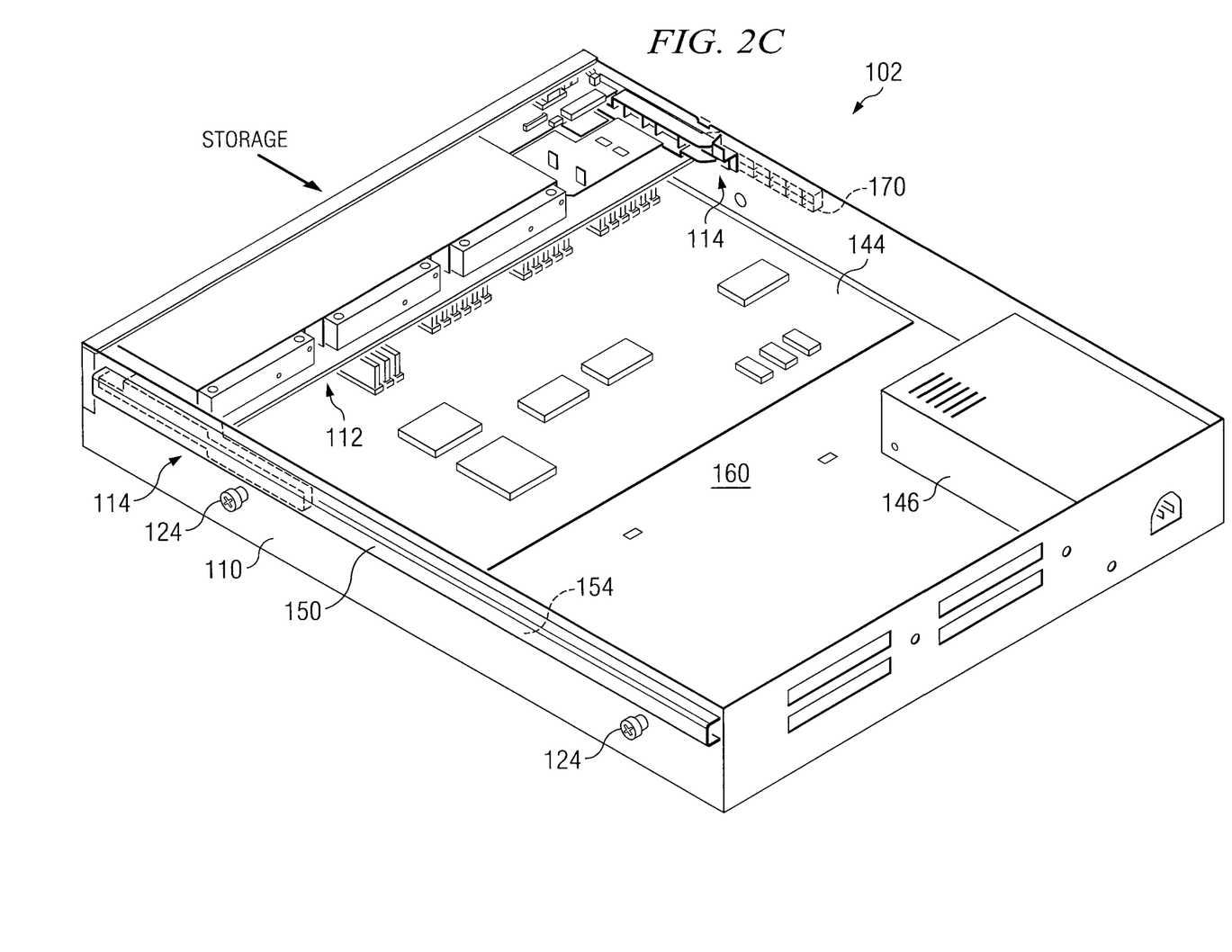

FIGS. 2A-2C illustrate a chassis 102 having a sliding carriage 112 in various configurations, according to certain embodiments of the present disclosure. FIG. 2A illustrates chassis 102 with carriage 112 slided forward to the access position (as indicated by the arrow labeled "Access"), with chassis base 110 ready to receive a motherboard or other information handling system components. FIG. 2B illustrates chassis 102 with a motherboard 144 inserted into chassis base 110 with carriage 112 in the access position. FIG. 2C illustrates chassis 102 with a motherboard 144 positioned in chassis base 110 with carriage 112 slided rearward to the storage position (as indicated by the arrow labeled "Storage").

As shown in FIGS. 2A-2C, chassis 102 includes chassis base 110, carriage 112, and carriage sliding system 114 for slidably coupling carriage 112 to chassis base 110. Chassis base 110 may have any suitable shape and/or configuration for housing one or more information handling system components, e.g., a motherboard 144, a power supply 146, fans, and/or other electrical components. Chassis base 110 may be formed from any suitable materials, e.g., aluminum or other suitable metal.

Chassis base 110 may include one or more securing elements 124 extending from each lateral side of chassis base 110. Securing elements 124 may be configured to be received in slots formed in rail 120 for slidably mounting chassis 102 in rack 106, e.g., as shown in FIG. 1. Securing elements 124 may be coupled to chassis base 110 in any suitable manner, or formed integral with chassis base 110.

Chassis base 110 may also define a hat section 150 on each lateral side of chassis base 110. Each hat section 150 may extend laterally outwardly above securing elements 124 on each side of chassis base 110. Hat sections 150 may be configured to rest on top of rails 120 when chassis 102 is installed in rack 106. Each hat section 150 may define a slot 154 extending along the respective lateral side of chassis base 110, each slot 154 opening toward the inside of chassis base 110. In some embodiments, a front portion of each slot 154 is used for receiving a sliding member of carriage sliding system 114, and a rear portion of each slot 154 may be used for passing cables (or unused).

Carriage 112 may have any suitable shape and/or configuration for housing or supporting one or more information handling system components, e.g., components that may be frequently accessed by users. For example, carriage 112 may be configured to house one or more disk drives, optical drives, tape units, control panels, etc. Carriage 112 may define multiple different storage areas, or bays, for housing multiple information handling system components. Carriage 112 may be formed from any suitable materials, e.g., aluminum or other suitable metal.

Carriage sliding system 114 comprises a system for slidably coupling carriage 112 to chassis base 110 such that carriage 112 can be slid forward to an access position (e.g., FIGS. 2A and 2B) and slid rearward to a storage position (e.g., FIG. 2C). In the storage position of carriage 112, a front area 160 of chassis base 110 configured to receive one or more electrical components is covered by carriage 112, whereas in the access position of carriage 112, at least a portion of the front area 160 of chassis base 110 is not covered by carriage 112.

As indicated by the arrow shown in FIG. 2A, carriage 112 may slided forward to an access position. In some embodiments, carriage sliding system 114 may include a stop or lock system that prevents carriage 112 from sliding completely out of chassis base 110. Such stop or lock system may include any suitable structure or device for limiting the sliding of carriage 112. In the access position of carriage 112, the whole area of chassis base 110 may be accessed by a user from above. Thus, the user may install various components into the whole area of chassis base 110, including the front area 160 of chassis base 110 that is covered by carriage 112 in the storage position of carriage 112 (FIG. 2C).

For example, in the access position of carriage 112, a motherboard 144 may be inserted into chassis base 110, as shown in FIG. 2B. A front portion 162 of motherboard 144 may extend into the front area 160 of chassis base 110. Thus, the sliding carriage 112 may permit a larger motherboard 144 may be installed in chassis base 110, as compared to a chassis 102 having a stationary chassis. In addition or alternatively, the sliding carriage 112 may increase the ease of installing a motherboard (especially a motherboard that extends into the front area 160 of chassis base 110) into chassis base 110.

In addition, the sliding carriage 112 may allow a user to more easily access components that are already installed in chassis base 110. For example, if a user wishes to remove and/or replace certain electrical component(s) located in front area 160 of chassis base 110, the user may slide carriage 112 to the access position to provide access to the electrical component(s) from above. As a particular example, suppose motherboard 144 includes DIMM memory slots 164 located in front area 160 of chassis base 110. A user may access such slots (e.g., to add a new DIMM, or remove/replace an existing DIMM) by sliding carriage 112 to the access position.

When the user has finishing installing or accessing the components in chassis base 110, the user may slide carriage 112 to the storage position, as shown in FIG. 2C. In the storage position, carriage 112 may cover various components (e.g., front portion 162 of motherboard 144) located in front area 160 of chassis base 110. Carriage 112 may be positioned in the storage position during normal use of information handling system 104.

Carriage sliding system 114 may comprise any system for slidably coupling carriage 112 to chassis base 110 such that carriage 112 can be slided between an access position (e.g., FIGS. 2A and 2B) and a storage position (e.g., FIG. 2C). For example, carriage sliding system 114 may include linear slides, rails, slots, grooves, etc. In some embodiments, carriage sliding system 114 may include linear slides including ball bearings, rollers, or other devices for facilitating the sliding of carriage 112.

In the illustrated example embodiment, carriage sliding system 114 includes elongated sliding members 170 extending rearward from each side of carriage 112. Sliding members 170 may be formed from any suitable materials, e.g., plastic, aluminum, steel, etc. Sliding members 170 may be coupled to carriage 112 in any suitable manner (e.g., by screws or other fasteners, welded, etc.) or may be formed integral with carriage 112.

Figure 3A:
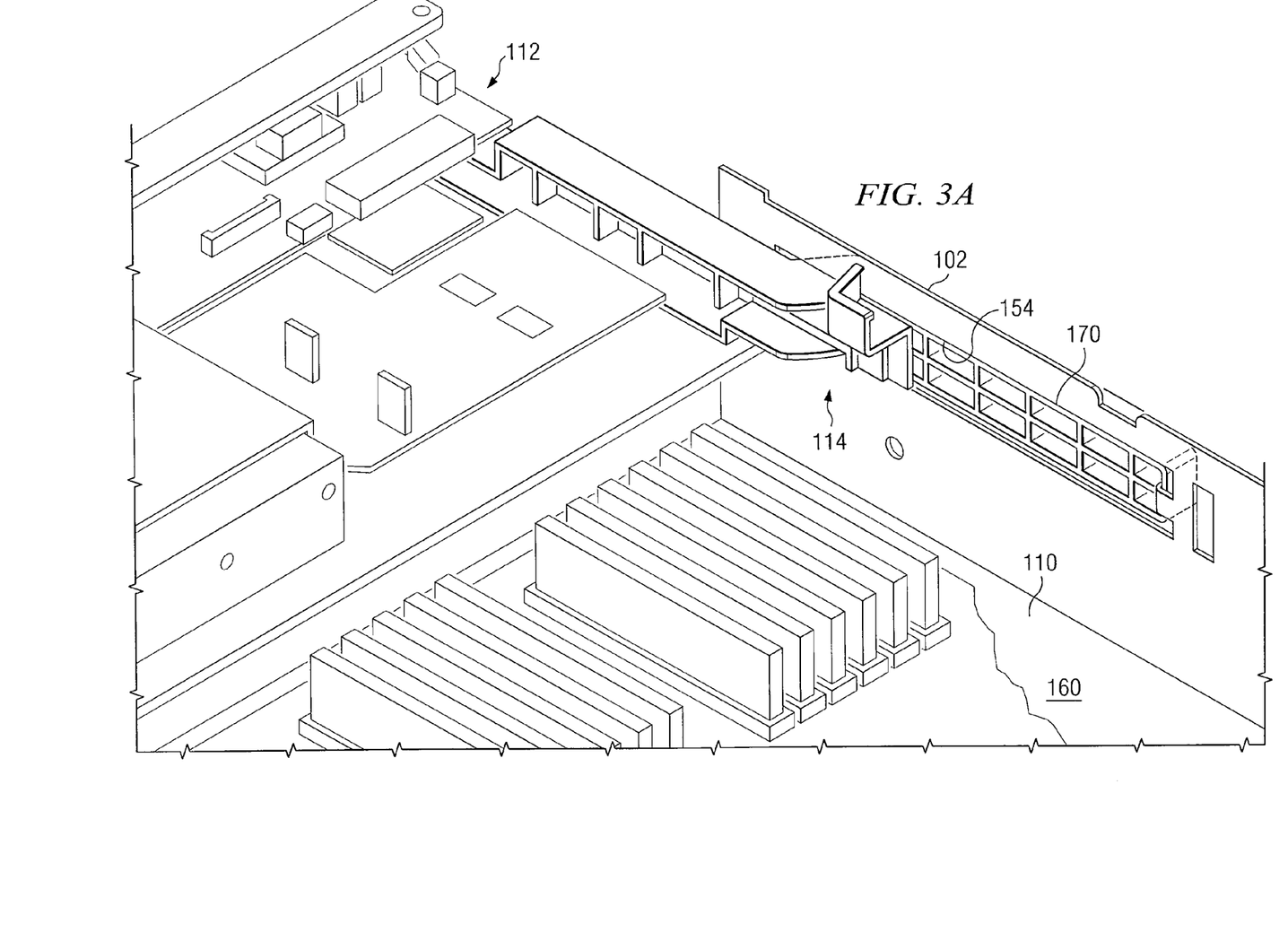
FIGS. 3A-3B illustrates portion of a carriage sliding system for sliding a chassis carriage between an access position and a storage position, respectively, according to certain embodiments of the present disclosure.
Figure 3B:
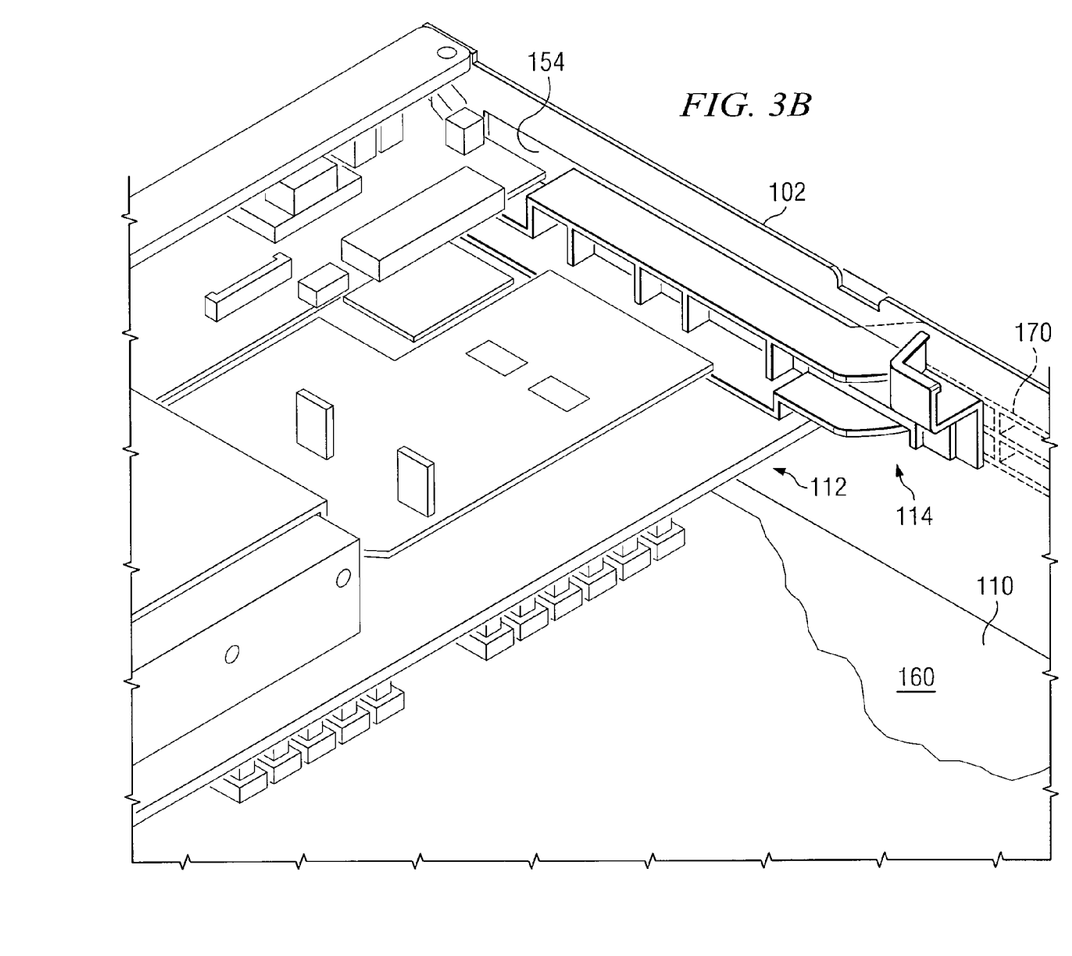

As shown in better detail in FIGS. 3A and 3B, each sliding member 170 may slide within a slot 154 defined within a hat section 150 extending along a lateral side of chassis 102. In some embodiments, carriage sliding system 114 may include ball bearings, rollers, or other devices for facilitating the sliding of sliding members 170 within slots 154.

FIGS. 3A-3B illustrate portions of carriage sliding system 114 for sliding carriage 112 between an access position and a storage position, respectively, according to certain embodiments of the present disclosure. As shown, carriage sliding system 114 includes a pair of sliding members 170 on opposite sides of carriage 112. Each sliding member 170 is configured to slide within a slot 154 defined by a hat section 150 on a lateral side of chassis 102.

Figure 4A:
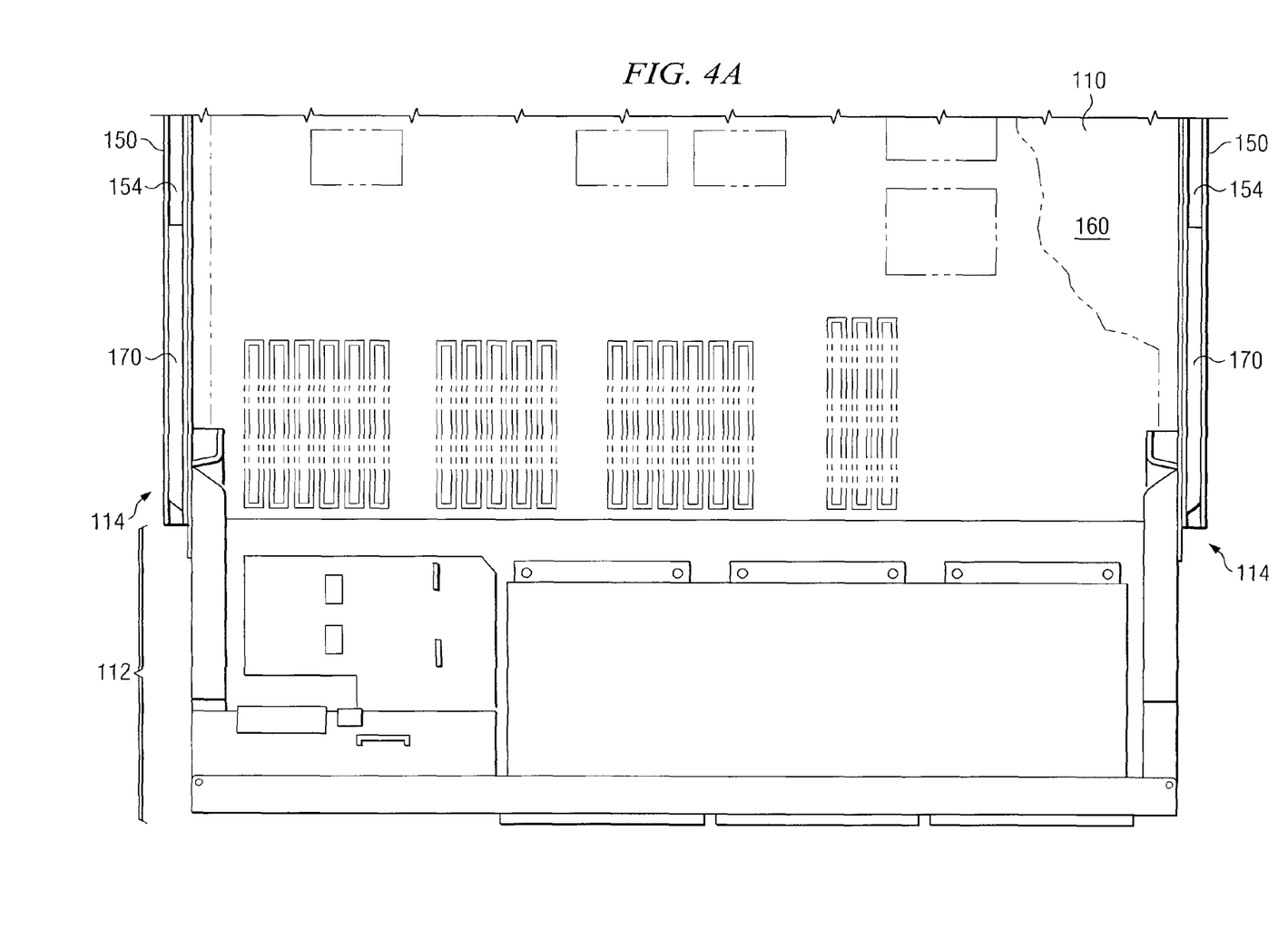
FIGS. 4A-4B illustrate top views of a chassis having a sliding carriage in an access position and a storage position, respectively, according to certain embodiments of the present disclosure.
Figure 4B:
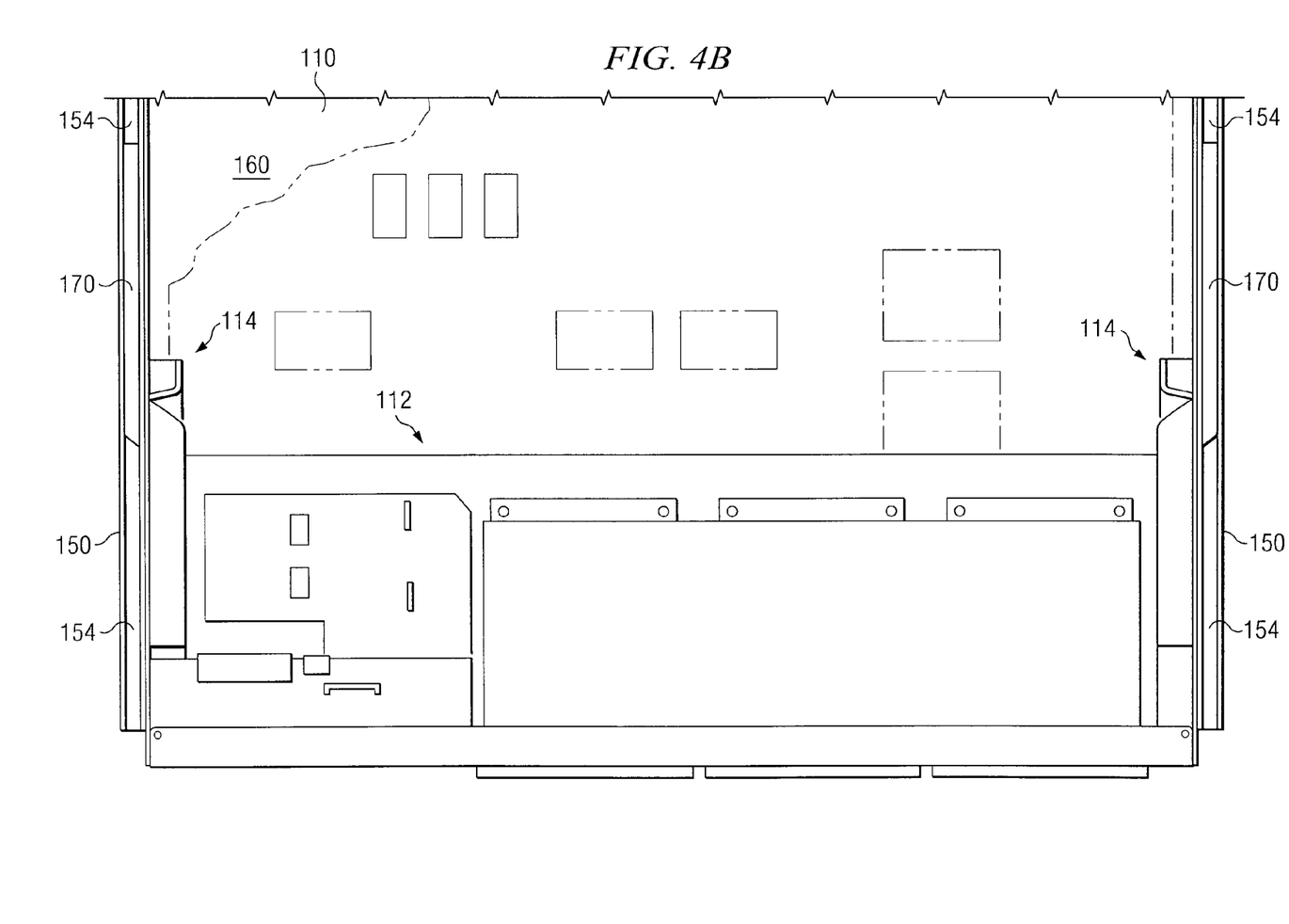

FIGS. 4A-4B illustrate top views of chassis 102 having sliding carriage 112 positioned in the access position and storage position, respectively, according to certain embodiments of the present disclosure. As shown, carriage sliding system 114 includes a pair of sliding members 170 on opposite sides of carriage 112. The sliding members 170 slide within slots 154 defined within hat sections 150 on opposite sides of chassis 102.

Figure 5:
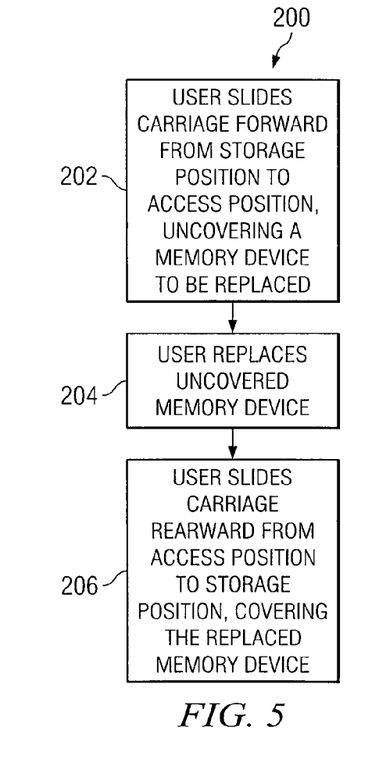
FIG. 5 is a flowchart illustrating an example method for using a chassis having a sliding carriage, according to certain embodiments of the present disclosure.

FIG. 5 is a flowchart illustrating an example method 200 for using a chassis 102 having a sliding carriage 112, according to certain embodiments of the present disclosure. In particular, method 200 is an example method for replacing a faulty memory device 180 (e.g., a DIMM module) on a motherboard 144 housed in chassis 102. In this example, motherboard 144 is housed in chassis 102 such that a front portion 170 of motherboard 144 is located in front area 160 of chassis base 110. The front portion 170 of motherboard 144 is covered by carriage 112 in the storage position of carriage 112.

At step 202, a user accesses chassis 102 and slides carriage 112 forward from the storage position to the access position. In some embodiments, the user may have to first unlock carriage 112 in order to slide carriage 112. By sliding carriage 112 forward to the access position, the memory device 180 becomes uncovered and accessible. In some instances, before or after sliding carriage 112 forward, the user may disconnect one or more cables (e.g., SAS cables connecting components in carriage 112 with motherboard 144) in order to provide better access to memory device 180.

At step 204, the user removes and replaces the faulty memory device 180 with a new memory device. At step 206, after replacing the faulty memory device 180, the user slides carriage 112 rearward from the access position back to the storage position, such that carriage 112 covers the new memory device. In some instances, before or after sliding carriage 112 rearward, the user may re-connect one or more cables disconnected at step 202.

In some instances, the user may be able to replace component(s) housed in chassis base 110, including components housed in front area 160, without having to remove chassis 102 from rack 106. In other instances, such as when another chassis is located immediately above the relevant chassis 102, the user may need to slide chassis 102 at least partially out of rack 106 in order to access the component(s) to be replaced.

Although the present disclosure has been described in detail, it should be understood that various changes, substitutions, and alterations can be made hereto without departing from the spirit and the scope of the disclosure as defined by the appended claims.

What is claimed is:

1. A chassis for an information handling system chassis, comprising:
    a chassis base configured to house a plurality of first electrical components;
    a carriage configured to house one or more second electrical components such that a user may access the one or more second electrical components from a front side of the chassis; and
    a carriage sliding system configured to slidably couple the carriage to the chassis base such that the carriage can be slided forward to an access position and rearward to a storage position;
    wherein in the storage position of the carriage, a front area of the chassis base configured to receive one or more first electrical components is covered by the carriage; and
    wherein in the access position of the carriage, at least a portion of the front area of the chassis base is not covered by the carriage.

2. The chassis according to claim 1, wherein one or more first electrical components housed in the front area of the chassis base are removable from the chassis when the carriage is positioned in the access position but not when the carriage is positioned in the storage position.

3. The chassis according to claim 1, wherein the carriage sliding system allows the carriage to slide relative to the chassis base but prevents the carriage from being removed from the chassis base.

4. The chassis according to claim 1, further comprising:
one or more securing elements located on a side of the chassis base, the one or more securing elements configured to slide within a rail for physically supporting the chassis; and
a hat section located on the side of the chassis base above on the one or more securing elements, the hat section defining an extended slot;
wherein the carriage sliding system includes a sliding member that slides in the extended slot defined by the hat section.

5. The chassis according to claim 1, wherein:
the chassis base is configured to house a circuit board such that a front portion of the circuit board is located in the front area of the chassis base, the front portion of the circuit board configured to support one or more particular first electrical components;
in the storage position of the carriage, the one or more particular first electrical components are covered by the carriage; and
in the access position of the carriage, the one or more particular first electrical components are not covered by the carriage are not covered by the carriage.

6. The chassis according to claim 1, wherein the carriage is configured to house one or more memory drives.

7. The chassis according to claim 1, wherein the chassis base is configured to house a circuit board such that a front portion of the circuit board is covered by the carriage in the storage position of the carriage.

8. A system, comprising:
an information handling system including one or more first electrical components and one or more second electrical components;
an information handling system chassis including:
a chassis base housing the one or more first electrical components;
a carriage housing the one or more second electrical components such that a user may access the one or more second electrical components from a front side of the chassis; and
a carriage sliding system configured to slidably couple the carriage to the chassis base such that the carriage can be slid forward to an access position and rearward to a storage position;
wherein in the storage position of the carriage, one or more particular first electrical components are covered by the carriage; and
wherein in the access position of the carriage, the one or more particular first electrical components are not covered by the carriage.

9. The system according to claim 8, wherein a particular first electrical component is removable from the chassis when the carriage is positioned in the access position but not when the carriage is positioned in the storage position.

10. The system according to claim 8, wherein the carriage sliding system allows the carriage to slide relative to the chassis base but prevents the carriage from being removed from the chassis base.

11. The system according to claim 8, further comprising:
one or more securing elements located on a side of the chassis base, the one or more securing elements configured to slide within a rail for physically supporting the chassis; and
a hat section located on the side of the chassis base above on the one or more securing elements, the hat section defining an extended slot;
wherein the carriage sliding system includes a sliding member that slides in the extended slot defined by the hat section.

12. The system according to claim 8, wherein:
the chassis base is configured to house a circuit board such that a front portion of the circuit board is located in the front area of the chassis base, the front portion of the circuit board configured to support one or more particular first electrical components;
in the storage position of the carriage, the one or more particular first electrical components are covered by the carriage; and
in the access position of the carriage, the one or more particular first electrical components are not covered by the carriage are not covered by the carriage.

13. The system according to claim 8, wherein:
the one or more first electrical components are supported on a circuit board; and
a front portion of the circuit board is covered by the carriage in the storage position of the carriage.

14. A system, comprising:
a rack;
a plurality of information handling system chassis supported by the rack, each information handling system chassis housing an information handling system;
at least one information handling system chassis including:
a chassis base configured to house a plurality of first electrical components;
a carriage configured to house one or more second electrical components such that a user may access the one or more second electrical components from a front side of the chassis; and
a carriage sliding system configured to slidably couple the carriage to the chassis base such that the carriage can be slid forward to an access position and rearward to a storage position;
wherein in the storage position of the carriage, a front area of the chassis base configured to receive one or more first electrical components is covered by the carriage; and
wherein in the access position of the carriage, at least a portion of the front area of the chassis base is not covered by the carriage.

15. The system according to claim 14, wherein one or more first electrical components housed in the front area of the chassis base are removable from the chassis when the carriage is positioned in the access position but not when the carriage is positioned in the storage position.

16. The system according to claim 14, wherein the carriage sliding system allows the carriage to slide relative to the chassis base but prevents the carriage from being removed from the chassis base.

17. The system according to claim 14, further comprising:
one or more securing elements located on a side of the chassis base, the one or more securing elements configured to slide within a rail for physically supporting the chassis; and
a hat section located on the side of the chassis base above on the one or more securing elements, the hat section defining an extended slot;
wherein the carriage sliding system includes a sliding member that slides in the extended slot defined by the hat section.

18. The system according to claim 14, wherein:
the chassis base is configured to house a circuit board such that a front portion of the circuit board is located in the front area of the chassis base, the front portion of the circuit board configured to support one or more particular first electrical components;
in the storage position of the carriage, the one or more particular first electrical components are covered by the carriage; and
in the access position of the carriage, the one or more particular first electrical components are not covered by the carriage are not covered by the carriage.

19. The system according to claim 14, wherein the chassis base is configured to house a circuit board such that a front portion of the circuit board is covered by the carriage in the storage position of the carriage.

20. The system according to claim 14, wherein each of the plurality of information handling system chasses includes a chassis base, a carriage, and a carriage sliding system configured to slidably couple the carriage to the chassis base such that the carriage can be slid forward to an access position and rearward to a storage position.

* * * * *